W. T. DONNELLY.
FLOATING DRY DOCK.
APPLICATION FILED JAN. 3, 1908.
920,282.
Patented May 4, 1909.
2 SHEETS—SHEET 1.
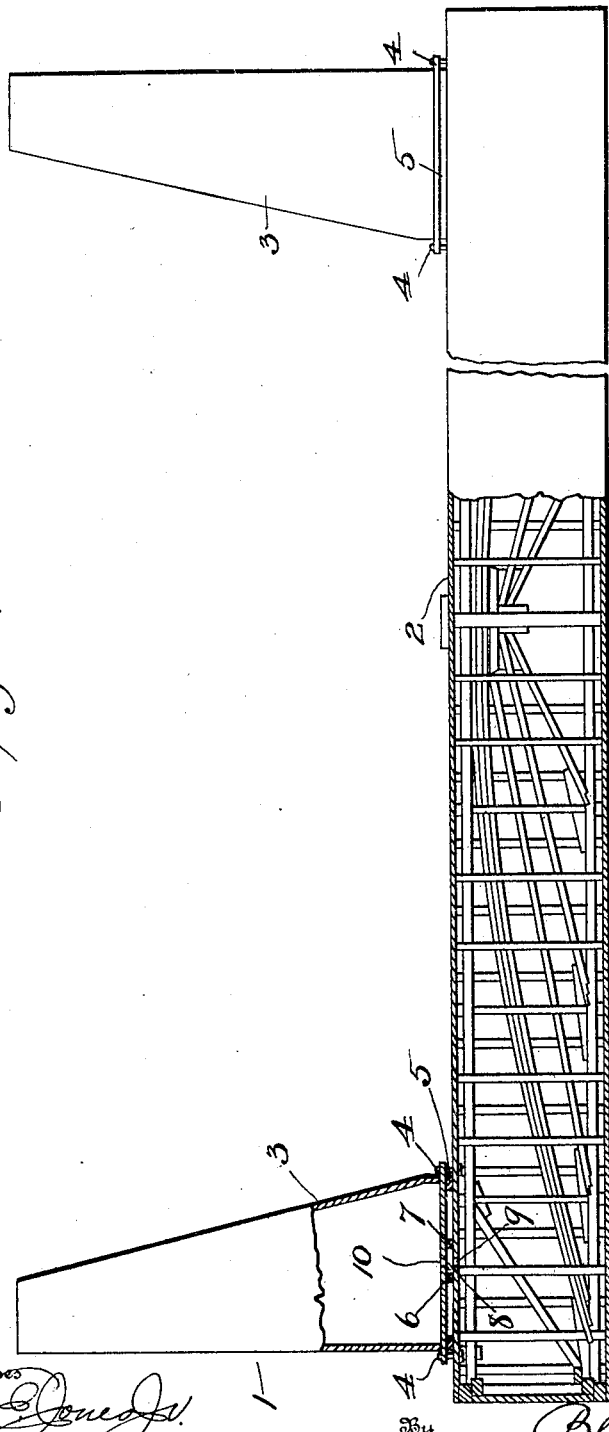
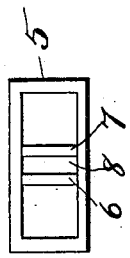
Witnesses
Inventor
William Thomas Donnelly
By Blackwood Bros.
his Attorneys.

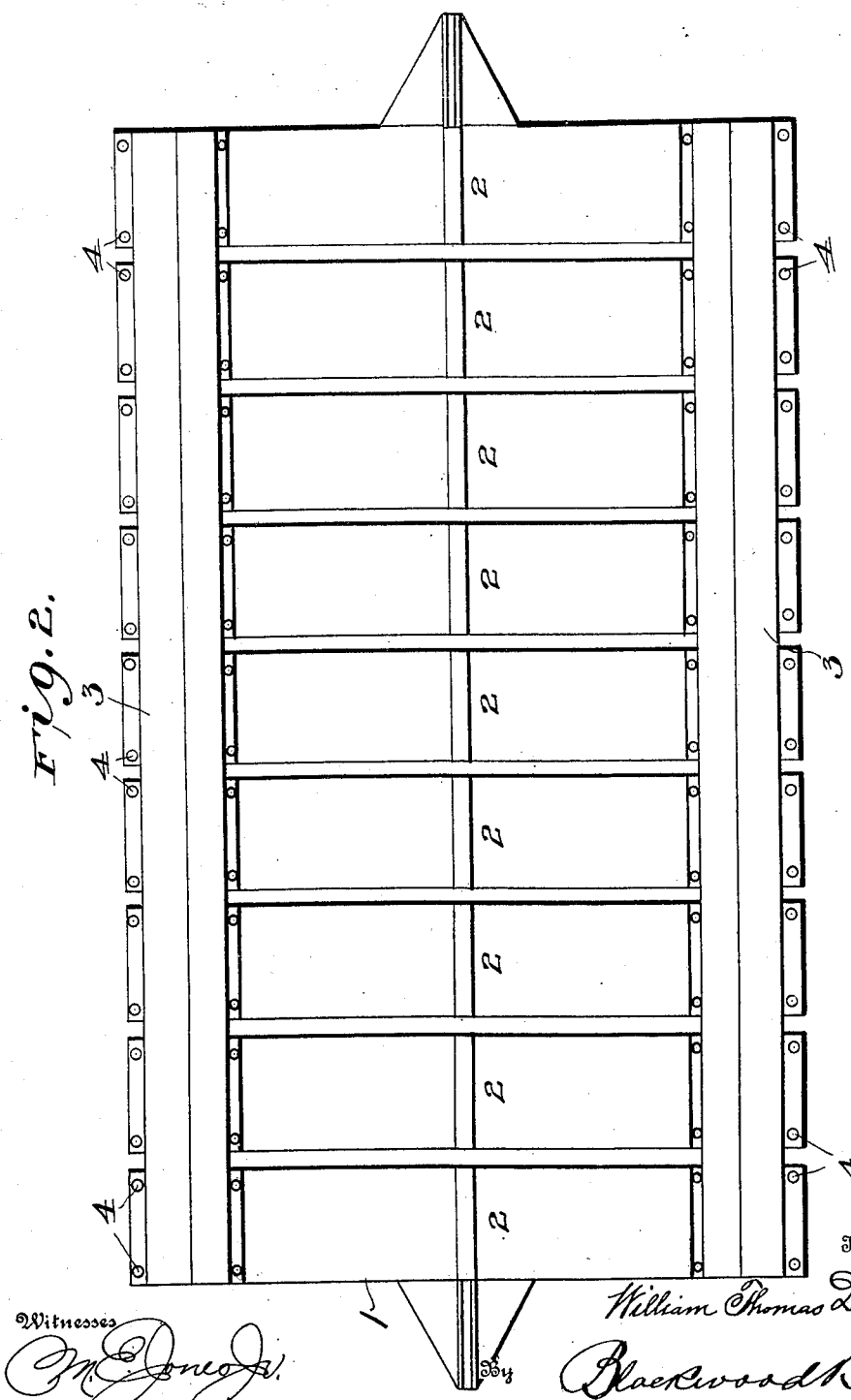

UNITED STATES PATENT OFFICE.

WILLIAM THOMAS DONNELLY, OF BROOKLYN, NEW YORK.

FLOATING DRY-DOCK.

No. 920,282.      Specification of Letters Patent.      Patented May 4, 1909.

Application filed January 3, 1908. Serial No. 409,178.

*To all whom it may concern:*

Be it known that I, WILLIAM THOMAS DONNELLY, a citizen of the United States, residing at Brooklyn, in the county of Kings and State of New York, have invented certain new and useful Improvements in Floating Dry-Docks, of which the following is a specification.

My invention relates to improvements in floating dry docks and more especially to a floating dry dock having wooden pontoons and hollow metal wings or sides.

It has for its objects to provide a floating dry dock which is fireproof, durable, strong and rigid, unsinkable, self docking, and not affected by atmospheric or temperature changes and which has a maximum amount of lifting power for a given size or dimensions of the pontoons.

From time to time attempts have been made to build composite structures for floating dry docks, that is, with steel framing or trusses covered with wood but all these attempts have been unsuccessful and unsatisfactory as it is very difficult to so connect the steel and wood as to give each the proper strength and at the same time obtain a sufficient or adequate bearing surface between the wood and steel.

By my invention I do not attempt a composite structure but a combined structure, that is, all those parts of the structure which support the weight of the ship, viz., the pontoons, are made entirely of wood and the wings or sides, which perform an entirely different function and have no part in supporting the weight of the ship, but simply connect the pontoons together, maintain the stability while the dock is being raised and lowered and provide longitudinal rigidity in the structure as a whole I make entirely of steel and each of these materials is especially adapted for the purpose for which it is used and the resultant dock is far superior to a dock built wholly of either wood or steel.

With wood as a structural material it has been found impracticable to construct a floating dry dock with continuous side walls or wings of a greater length than three hundred feet but with steel as a structural material for the wings it is entirely practical and feasible to extend the length of floating dry docks with continuous side walls or wings to any desired length. In a floating dry dock with steel side walls or wings and wooden pontoons the weight of the steel sides or wings is only just sufficient to sink the entire structure, when all the pontoons and the side walls are flooded, consequently the total submergence of the dock is highly improbable as a reserve bouyancy in any one or two of the pontoons would prevent the sinking of the dock. In case of injury to one of the wooden pontoons of this dock and its complete flooding with water it will upon detachment from the steel side walls or wings continue to float whereas a steel pontoon under the same conditions could not be handled without supplementary floats or other wrecking appliances.

In all timber floating dry docks it is necessary to sacrifice a large amount of lifting power on account of the ballast required to sink the dock after water has been allowed to enter it. As the timber available for building these docks, including the fastenings and pumping machinery for the same, does not have a greater weight than 46 pounds per cubic foot and the weight of sea water is 64 pounds per cubic foot, it is necessary to add in ballast for every cubic foot of lumber used the difference, or 18 pounds, and as a cubic foot of lumber contains 12 board feet this amounts to one pound and a half of ballast per board foot of lumber used. A five thousand ton floating dry dock will require approximately one and one half million board feet of lumber consequently requiring two million two hundred and fifty thousand pounds of ballast, or one thousand one hundred and twenty five tons. The commercial cost of this ballast necessitates the use of stone and as it is not possible to obtain stone of a greater specific gravity than two hundred pounds per cubic foot and as the ballast is submerged there is a loss of 64 pounds per cubic foot due to its displacement and this necessitates the increase of the stone ballast in proportion to the relation of its specific gravity to its weight, that is, to obtain one thousand one hundred and twenty five tons of effective ballast it is necessary to use 1650 tons of stone. This means that a timber floating dry dock to have a net lifting power of five thousand tons must be increased in dimensions so as to provide for supporting 1650 tons of stone as well as the weight of the ship when pumped out. By the use of steel wings or sides and wooden pontoons the wings act as ballast sinkers for the wood of the pontoons and by this means I obtain an increase in lifting power with the same dimension of pontoons of about 1650 tons.

Wood exposed to the atmosphere and moisture and temperature changes, rapidly deteriorates and when the wings are in one structure or piece with the pontoons or lifting power it is difficult to replace them or keep them in proper repair, on the other hand when the wings are built of steel and are not subjected to the action of salt water, except for a short time while the dock is lowered or submerged, there is little or no difficulty experienced in so protecting them that the whole structure will have an indeterminate or long life, and in fact with a pontoon and wing dock constructed of separate pieces as herein shown it is possible at any time to wholly replace a pontoon or wing, and in a dock of a lifting capacity of five thousand tons for less than ten per cent. of the original cost of the dock, and as this could be done from time to time the integrity of the structure as a whole will always be maintained.

A dock with steel wings and wooden pontoons is fireproof as the steel wings cannot burn, and the wooden pontoons being submerged in the water cannot burn.

Referring to the drawings: Figure 1, is an end view in elevation, partly in section, Fig. 2, a top plan view, Fig. 3, a top plan view of the frame which is placed between the bottom of the wings and the top of the pontoons.

In the drawings in which like numerals of reference denote like parts throughout the several views, 1, represents the floating dry dock, which as shown is composed of a series of 9 wooden pontoons 2, but which may comprise a greater or less number, as may be found necessary to meet the different requirements. Sides or wings 3, made of steel or other suitable metal, and which are hollow and made water and air tight, are mounted on the series of pontoons and secured thereto by suitable bolts 4. The pontoons are designed to be provided with the usual keel-blocks, bilge-blocks, water inlets and outlets, and other parts necessary for the operation of the dock, which are not shown as they form no part of the invention.

A rectangular frame 5, is mounted between the top of each pontoon and the bottom of the sides or wings, which provides an air and water tight connection, and at substantially its central portion is provided with transverse strips or partitions 6 and 7, between which a closed chamber or compartment 8, is formed.

The top of each pontoon is provided with an aperture 9, and the bottom of the wings are provided with a series of apertures 10, in alinement with the apertures 9, said apertures and the chamber 8, furnishing communication between the pontoons and the wings.

The shape and size of both the wings or sides and the pontoons may be varied to meet the different requirements found necessary to adapt the dock to the use for which it is to be constructed.

I do not desire to be understood as limiting myself to the specific details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

What I claim is:—

1. In a floating dry-dock, a series of pontoons buoyant when filled with water, sides or wings supported thereon non-buoyant when filled with water and passages establishing communication between said pontoons and sides or wings, whereby water is admitted to and exhausted from the sides or wings through the pontoons, substantially as described.

2. In a floating dry-dock, a series of pontoons buoyant when filled with water, sides or wings supported thereon non-buoyant when filled with water and registering apertures establishing communication between said pontoons and said sides or wings, whereby water is admitted to and exhausted from the sides or wings through the pontoons, substantially as described.

3. In a floating dry-dock, a series of pontoons buoyant when filled with water, sides or wings supported thereon non-buoyant when filled with water and means establishing communication between said pontoons and sides or wings, whereby water is admitted to and exhausted from the sides or wings through the pontoons, substantially as described.

In testimony whereof I have signed my name in the presence of two subscribing witnesses.

WILLIAM THOMAS DONNELLY.

Witnesses:
JAMES W. MCELHINNEY,
WILLIAM J. CAMPBELL.